A. Dunn,
Lifting Jack.

N° 56,538.      Patented July 24, 1866.

Witnesses:
Jas. A. Service
J. W. R. Covington

Inventor;
Aebert Dunn
Per Munn & Co.
Attorneys

UNITED STATES PATENT OFFICE.

ALBERT DUNN, OF PLAINFIELD, NEW JERSEY.

IMPROVEMENT IN WAGON-JACKS.

Specification forming part of Letters Patent No. 56,538, dated July 24, 1866.

*To all whom it may concern:*

Be it known that I, ALBERT DUNN, of Plainfield, Union county, State of New Jersey, have invented a new and useful Improvement in Wagon-Jacks; and I do hereby declare that the following is a full, clear, and exact description thereof, which will enable others skilled in the art to make and use the same, reference being had to the accompanying drawings, forming part of this specification.

The wagon-jack embraced in the present invention consists of two bars or frames of unequal lengths, which, through a lever-handle pivoted to one end of the longer one of the said bars, and hung upon a fulcrum in one end of the other or shorter bar, are connected together, one of which bars, or that having the handle pivoted to it, is provided with a rest or support for the axle of a wagon, whereby, if the jack be stood upon the ground by its two bars or legs with the rest of the longer leg under the axle of a wagon or other vehicle, and the handle-lever then depressed, it will so act upon the bar of the jack upon the rest of which the wagon-axle is supported as to cause it to raise or lift the said axle, when, releasing the hand from the handle-lever of the jack, the weight of the wagon then resting upon the jack will firmly hold it in position until, it being desired to remove the jack from the wagon-axle, its handle is then raised, thereby lowering the axle and bringing the wagon down again upon the wheels, as will be apparent from the following detail description of the improved wagon-jack, reference being had to the accompanying plate of drawings, in which—

Figure 2:
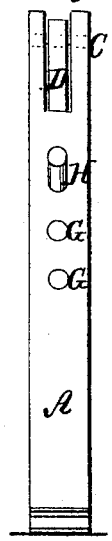
Figure 1:
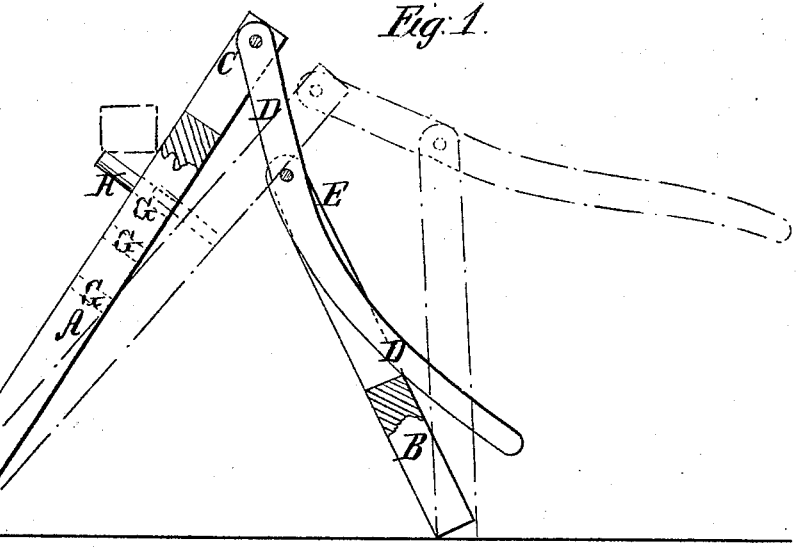

Figure 1 is a side view of the wagon-jack, showing its several parts in two positions, one in red lines; and Fig. 2, an end view.

Similar letters of reference indicate like parts.

A and B in the drawings represent the two bars or frames of the wagon-jack, one of which, A, is longer than the other, B, and has pivoted to its upper end, C, a handle-lever, D, which is hung upon a fulcrum in the upper end, E, of the shorter bar B, which, for a portion of its length, is slotted, as plainly indicated in Fig. 1.

In longer bar A a series of apertures, G, are made to receive a pin, H, which, when the jack is to be applied to the axle of a wagon or other vehicle, is placed under the axle with the two bars of the jack resting or standing upon the ground, when, depressing the handle-lever D, the bar, having the support for the wagon-axle, and upon which it rests, is thereby caused to approach a vertical or more upright or perpendicular position, carrying the wagon-axle with it, and thus raising or lifting it, as is obvious without any further explanation from the above and by an examination of the drawings. The weight of the wagon resting upon the jack, firmly holding it in position until raising the lever-handle, the wagon can be again easily brought down upon its wheels.

By having a series of holes in the bar A the axle-support of the jack can be adjusted to the varying heights of wagon-axles; but in lieu of the said rest-pin, other forms of supports may be used, as is obvious.

From the above description of my improved wagon-jack it is plainly apparent that it is exceedingly simple in construction, cheap to manufacture, and effective in operation, as well as convenient and advantageous for use—advantages of the utmost importance.

I claim as new and desire to secure by Letters Patent—

The combination of the bars or frames A and B, or their equivalents, and handle-lever D, when constructed, arranged, and connected together so as to oparate substantially in the manner described, and for the purpose specified.

ALBERT DUNN.

Witnesses:
ALBERT W. BROWN,
JAMES A. SERVICE.